United States Patent [19]

Sproul

[11] 3,994,181

[45] Nov. 30, 1976

[54] NOISE-DAMPENED PULLEY CONSTRUCTION

[75] Inventor: Nolte V. Sproul, Canton, Ohio

[73] Assignee: Aspro, Incorporated, Westport, Conn.

[22] Filed: July 24, 1975

[21] Appl. No.: 598,796

[52] U.S. Cl. .............................. 74/230.8; 29/159 R; 74/230.3

[51] Int. Cl.² .................... F16H 55/44; F16H 55/36; B21D 53/26

[58] Field of Search.......... 29/159 R; 74/443, 230.8, 74/230.3, 573, 574

[56] References Cited

UNITED STATES PATENTS

| | | | |
|---|---|---|---|
| 2,473,335 | 6/1949 | Hardy | 74/230.8 X |
| 3,633,431 | 1/1972 | Van Bussel | 74/230.8 |
| 3,851,336 | 12/1974 | Jacobs | 29/159 R |

*Primary Examiner*—Leonard H. Gerin
*Attorney, Agent, or Firm*—Frease & Bishop

[57] ABSTRACT

A noise-dampened V-grooved sheet metal pulley having one or more adjacent annular V-grooves formed in a wall of a cup-shaped blank. The pulley has tensioned dampening means engaged against or laminated with at least one V-groove wall of the pulley. The dampening means may be a circular metal or plastic material washer trapped and locked during spinning of the pulley between fold layers of a double flange fold of a pulley V-groove wall. The dampening means also may be a thin-walled metal or plastic tubular member conforming to and tensioned during spinning against the inside surface of one or more pulley V-grooves, which provides a laminated groove wall structure. The dampening means also may be a ring-like member, generally L-shaped in cross section, fixed to one portion of the pulley and tensioned against the inside surface of at least one pulley V-groove wall. The dampening means also may comprise air or heat-cured plastic means on an inner pulley wall surface that is trapped and locked during spinning between fold layers of a double flange fold of a pulley V-groove wall. Both multiple and single groove pulleys are provided with dampening means which alter the vibration frequency of the pulleys, resulting in a reduced pulley noise level during pulley operation.

15 Claims, 13 Drawing Figures

NOISE-DAMPENED PULLEY CONSTRUCTION

BACKGROUND OF THE INVENTION

1. Field of the Invention

The invention relates to spun V-grooved sheet metal pulleys in which one or more V-grooves are formed in an annular flange or side wall of a cup-shaped blank, in which the V-grooves are relatively narrow and relatively deep, and in which the pulley noise level in operation is reduced.

More particularly, the invention relates to the provision of noise dampening means trapped and locked under tension between layers of a double flange fold of a pulley V-groove wall; or to the provision of noise dampening means tension-engaged against an inside surface of at least one of the V-groove walls of the V-groove pulley.

2. Description of the Prior Art

Single and multiple V-grooved sheet metal pulleys, particularly those of the type having the pulley grooves spun in a cylindrical side wall of a sheet metal cup of innumerable sizes and cross-sectional configurations, have been used extensively for many years, such as the pulleys shown in U.S. Pat. Nos. 2,685,856, 2,827,225, 2,869,223, and 3,852,863.

Such pulleys in operation, particularly under heavy belt loads and at certain speeds, have been found to develop a natural resonant frequency of vibration which produces a ringlike or whining noise, which is objectionable, particularly in the operation of motor vehicles.

Many expedients have been tried in attempts to reduce or dampen the noise level of such pulleys during operation; but prior to the invention, no satisfactory answer to such noise problem has been found of which I am aware.

Accordingly, there has been an existing need for many, many years for a spun dynamically-balanced single or multiple V-grooved sheet metal pulley in which the noise level resulting from vibration frequency of the pulley at certain speeds under heavy belt loading can be eliminated or reduced to an unobjectionable minimum level.

SUMMARY OF THE INVENTION

Objectives of the invention include providing a new noise-dampened construction of V-grooved sheet metal pulleys having one or more V-grooves; providing a noise-dampened V-grooved pulley construction in which the noise-dampening means alters the natural resonant frequency of vibration of the pulley, as compared with the same pulley in which noise-dampening means is omitted; providing such a noise-dampened pulley construction in which noise-dampening means is trapped and locked in the spun double flange fold of a V-groove pulley wall; providing a noise-dampened pulley construction in which the noise-dampening means is tensioned against the inside surface of one or more V-walls of a V-grooved pulley; providing such noise-dampened V-groove pulley constructions in which the noise-dampening means comprises metal or plastic material; Providing a noise-dampened spun V-grooved pulley construction of any one of the various types referred to, which is inexpensive to manufacture, which satisfactorily reduces the noise level of the pulley during operation, which eliminates difficulties heretofore encountered, achieves the various objectives indicated in a practical, workable and inexpensive manner, and which solves problems and satisfies needs which have long existed in the spun V-grooved sheet metal pulley art.

These objectives and advantages are obtained by the improved noise-dampened V-grooved sheet metal pulley construction, the general nature of which may be stated as including in a V-grooved sheet metal, preferably sheet steel, pulley having one or multiple V-grooves roller spun in a single cup-shaped sheet metal blank; tensioned noise dampening means engaged against or laminated with at least one V-groove wall of the pulley V-grooves; said tensioned means comprising at least one noise dampening means of the class consisting of: circular metal or plastic material washer means trapped, locked and laminated during V-groove roller spinning between folds of a spun double flange fold which forms a V-groove wall of the pulley; thin-walled metal or plastic material tubular means conforming to and tensioned and laminated during V-groove roller spinning against the inside surfaces of the walls of one or more pulley V-grooves; ring like means, L-shaped in cross section, fixed to one portion of a pulley and tensioned against the inside surface of at least one pulley V-groove wall; and air or thermo cured plastic means on an inside surface of a pulley V-groove wall, trapped, locked and tensioned against and laminated with said wall surface; and said tensioned means altering the vibration frequency of the pulley at pulley operating speeds under load, from the natural resonant frequency of a similar pulley not equipped with said tensioned means, to reduce the noise level of the pulley.

BRIEF DESCRIPTION OF THE DRAWINGS

Preferred embodiments of the invention — illustrative of the best modes in which applicant has contemplated applying the principles — are set forth in the following description and shown in the drawings and are particularly and distinctly pointed out and set forth in the appended claims.

Similar numerals refer to similar parts throughout the various figures of the drawings.

DESCRIPTION OF THE PREFERRED EMBODIMENTS

First Embodiment

A typical spun V-grooved sheet metal pulley with one annular groove is indicated generally at 1 and includes a generally cup-shaped hub body 2 terminating at one end in an annular V-groove 3 formed by a double flange fold V-groove wall 4 and a single V-groove flange wall 5.

Figure 2:
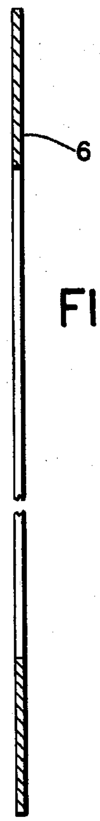
FIG. 2 is a sectional view, illustrating the washer used as the dampening means in the construction of FIG. 1.

In accordance with the invention, a noise dampening circular washer 6, shown in FIG. 2, is located, trapped and locked in the double flange fold 4, as indicated at 7, during the operation of spinning the V-groove 3 in a cup-shaped blank. Such spinning operation may be carried out as set forth in U.S. Pat. No. 2,685,856.

Figure 1:
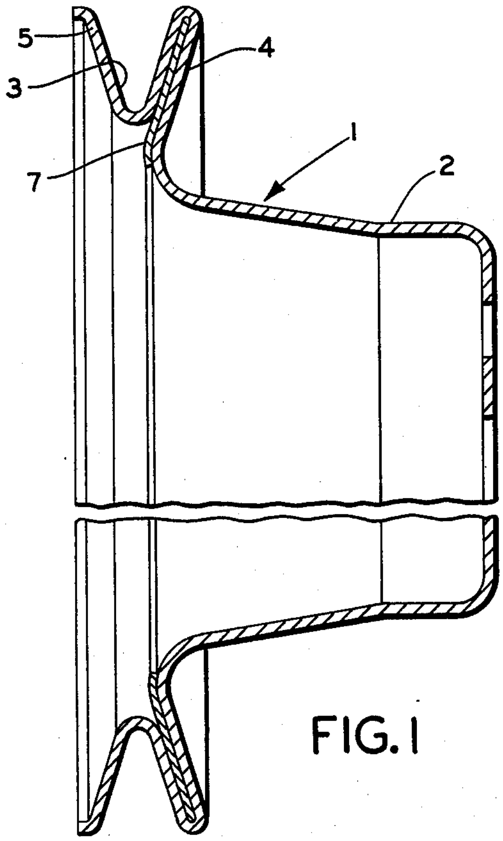
FIG. 1 is a somewhat diagrammatic sectional view of a single-groove pulley with noise dampening means clamped and locked under tension in the double flange fold of the pulley.

The flat circular washer 6 is reformed to the shape 7 (FIG. 1) having the usual 18° angle of the double flange fold 4 during the spinning of the V-groove 3. The washer 6 may be formed of the same metal as the sheet metal from which the pulley 1 is formed, usually sheet steel. Also, the washer 6 preferably has a lighter gauge than the thickness of the V-groove sheet metal walls 4 and 5 of the pulley 1. However, the washer 6 may be formed of plastic material rather than sheet steel.

The reformed washer 6 which is trapped and locked between the fold layers of the double flange fold 4, is worked and ironed during roller spinning of the V-groove. Thus, the noise-dampening member 7 is tensioned against one of the fold walls of the fold 4 where it is held in tension between and laminated with the fold walls.

Second Embodiment

Figure 4:
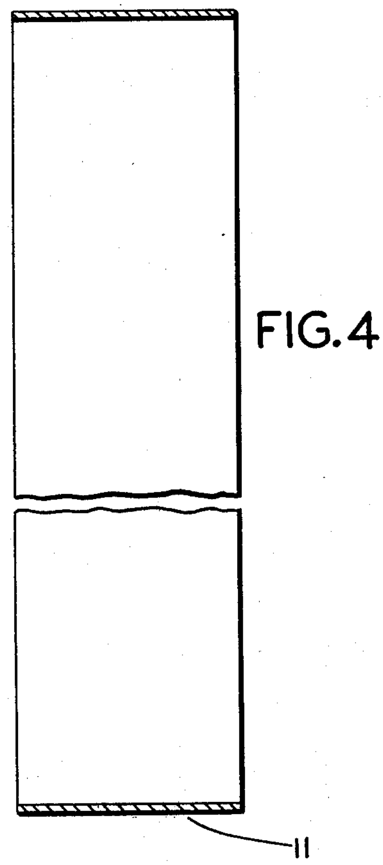
FIG. 4 is a sectional view of a thin wall tubular member used as the dampener means in the pulley of FIG. 3.
Figure 5:
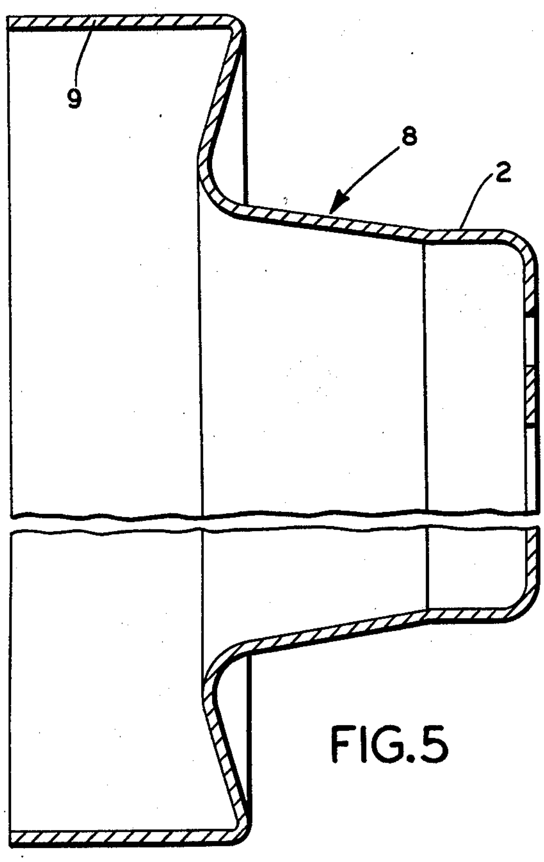
FIG. 5 is a sectional view of a cup-shaped blank used to form the pulley of either FIG. 1 or FIG. 3.
Figure 6:
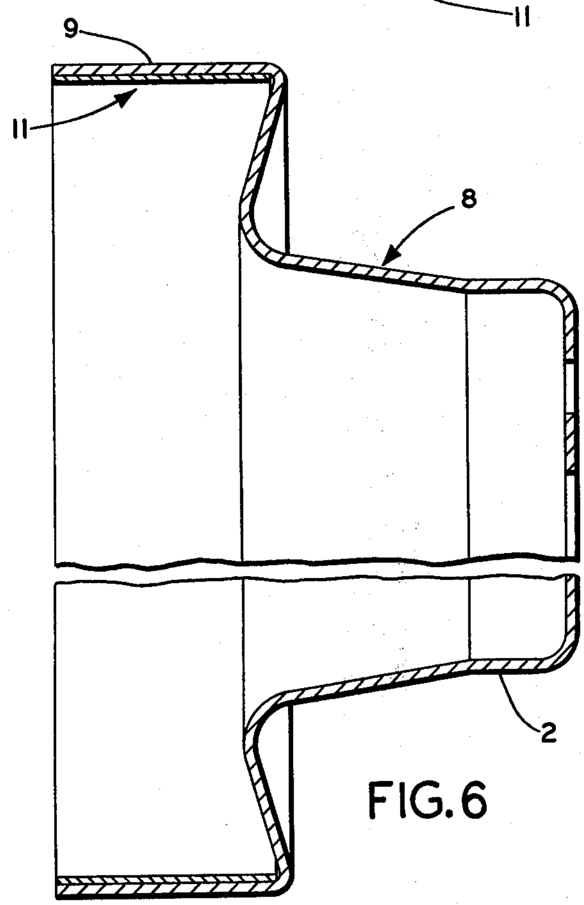
FIG. 6 is a view similar to FIG. 5, showing the ringlike tubular member of FIG. 4 assembled in the cup blank of FIG. 5 prior to spinning a V-groove therein to produce the pulley of FIG. 3.
Figure 3:
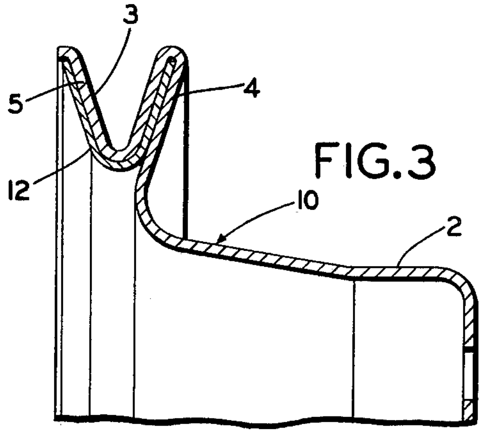
FIG. 3 is a fragmentary view similar to a portion of FIG. 1, illustrating another form of dampening means trapped and locked under tension in the double flange fold of a spun V-grooved pulley and engaged under tension with the remainder of the inside surface of the V-groove.

A slightly different approach for providing the pulley with the noise-dampening means is shown in FIGS. 3, 4, 5 and 6. A cup-shaped pulley blank, generally indicated at 8, is shown in FIG. 5 prior to having a V-groove spun in its cylindrical flange 9 to form the pulley, generally indicated at 10 in FIG. 3. The cup-shaped blank 8 also may be used to form the pulley 1 of FIG. 1. FIG. 4 illustrates a thin-walled metal or plastic noise-dampening tubular member 11 which is telescoped within the flange 9 of cup-shaped blank 8 (FIG. 6) prior to spinning a pulley groove in the flange 9.

During the spinning operation, which may be carried out on apparatus shown in U.S. Pat. No. 2,685,856, the tubular member is reformed, as shown at 12, to conform to and to be tensioned against the inside surface of the V-groove 3 formed by the double flange fold wall 4 and the single flange wall 5 of the pulley 10. Again, the noise-dampening component 12 in the pulley 10 is tensioned against the inside surface of the pulley groove-forming walls as a laminate structure.

Third Embodiment

Figure 7:
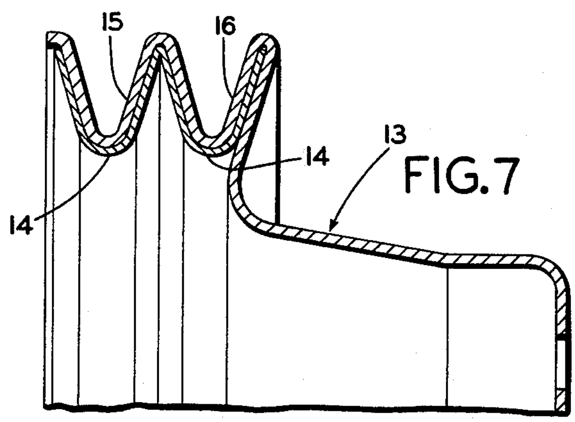
FIG. 7 is a view similar to FIG. 3 showing dampener means of the type shown in FIG. 3 applied to a multi-groove pulley.

FIG. 7 illustrates a double-groove pulley 13 provided with noise-dampening components 14 reformed during the spinning of the pulley grooves 15 and 16 in the same manner as described in connection with FIGS. 3 to 6. The double groove pulley 22 may be spun in accordance with the method shown in U.S. Pat. No. 2,869,223; and the noise-dampening components 14 function in the same manner as described in connection with FIG. 3.

Fourth Embodiment

Figure 8:
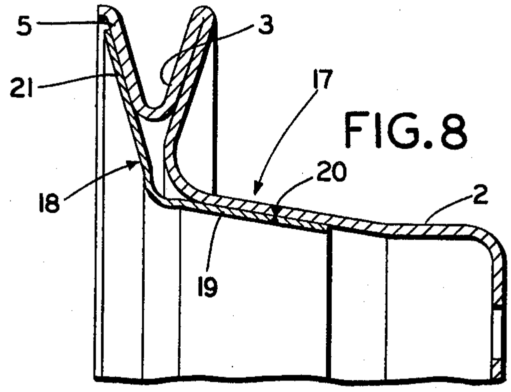
FIG. 8 is a view similar to FIGS. 1 and 3 showing an alternate type of tensioned damper means assembled to a single V-groove pulley.

Another noise-dampened pulley is indicated generally at 17 in FIG. 8, which may be spun from a cup-shaped blank, such as indicated in FIG. 5. The noise-dampening component, however, comprises a ring-like sheet metal member 18, generally L-shaped in cross-section, which has one flange 19 thereof spot-welded at 20 to the cup body 2. The other flange 21 of noise-dampener member 18 is held in contact under tension with the single flange wall 5 of the pulley groove 3. Such tension is developed by positioning of the member 18 within the pulley body 2 as the spot welds 20 are formed to hold the flange 19 of the member 18 fixed with respect to the cup body 2.

Fifth Embodiment

Figure 9:
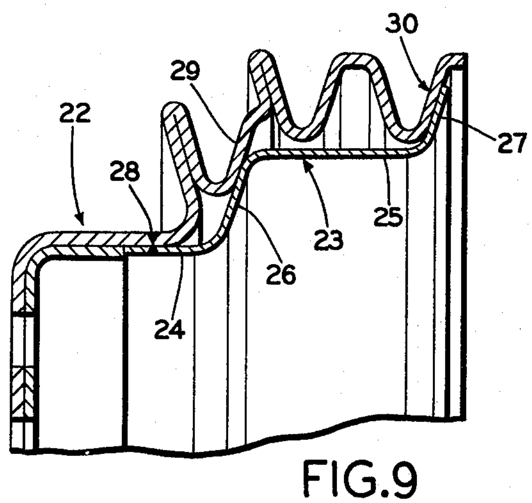
FIG. 9 is a view similar to FIG. 8, showing dampener means of the type shown in FIG. 8 applied to a multi-groove V-groove pulley.

FIG. 9 illustrates a pulley 22 which may have three V-grooves spun therein, in accordance with U.S. Pat. No. 3,852,863. Pulley 22 is provided with noise-dampening means 23 of the same type as that shown in FIG. 8. The member 23 has a double L-shape with two generally cylindrical portions 24 and 25 and two angular flange portions 26 and 27.

The cylindrical portion 24 of member 23 may be spot-welded at 28 to the body of three-groove pulley 22. The angular flange portions 26 and 27 are maintained tensioned respectively against the inner surfaces of the pulley groove walls 29 and 30.

The surface of the angular flange portion 27 of noise-dampener member 23 which contacts the pulley groove wall 30 may be coated with a rubber base adhesive which is thermo-cured prior to assembly of the member 23 within the spun pulley. Thus, a non-metal contact is maintained between the metal flange member 27 and the pulley groove wall 30.

Sixth Embodiment

Figure 10:
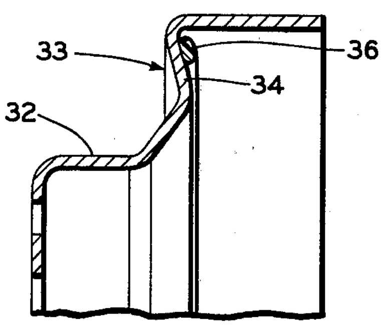
FIG. 10 is a fragmentary view similar to FIG. 5 of another form of pulley with an annular bead of plastic material applied to the inner surface of the formed cup prior to spinning.
Figure 11:
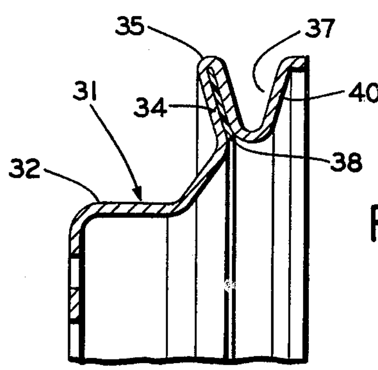
FIG. 11 is a view similar to FIG. 10 showing a pulley spun from the blank of FIG. 10 with the plastic material spread, trapped, locked and tensioned in the double flange fold of the pulley.

Another embodiment of the noise-dampened spun V-groove sheet metal pulley is indicated at 31 in FIG. 11. The pulley 31 has a slightly different form of cup body 32 and may be formed from the cup-shaped blank, generally indicated at 33 in FIG. 10.

The cup blank 33 after formation, preferably has its angular wall surface 34 which later becomes one wall of the double flange fold 35, pretreated with a spray application of hexane primer. A narrow annular bead 36 of an acrylic plastic compound then is extruded onto the wall surface 34, as shown in FIG. 10. The thus treated cup blank 33 is then spun, as previously described, to form the V-groove 37, as shown in FIG. 11, and the reformed plastic material becomes trapped and held under tension between the folds, as indicated at 38.

One plastic material composition satisfactorily used comprised an acrylic material composed of 100% polymers, with no solvents. This material being anerobic, required no thermo cure. Some pulleys spun immediately after applying the plastic bead 36 exhibited definite dampening characteristics. There characteristics, however, were enhanced when the pulleys were spun sometime after the plastic material was applied, which permitted ambient air aging of the plastic material before spinning and trapping the plastic material between the double walls 35.

Seventh Embodiment

Figure 12:
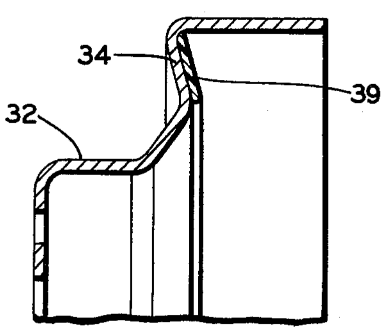
FIG. 12 is a view similar to FIG. 10, illustrating a plastic material band applied to an inner surface of the formed cup and air or thermo-cured thereon prior to spinning a V-groove pulley, such as shown in FIG. 11.

A slight modification of the manufacture of the pulley 31 of FIG. 11 is shown in FIG. 12. FIG. 12 illustrates the same cup-shaped pulley blank 32, but it has a modified plastic material coating 39 applied to the angular wall surface 34. The modified plastic material 39 may be a typical or usual Plastisol material which does not require a primer but which does require a thermo cure at say 350°.

Eighth Embodiment

Test results on noise-dampened V-grooved sheet steel pulleys described, provided with the various noise-dampening means, tensioned against at least one V-groove wall of the pulley, indicate, noticeably and appreciably, alteration of the vibration frequency of the pulleys in operation.

Test results carried out on the structure of the pulley 31 of FIG. 11 using plastic material as shown in FIGS. 10 and 11 establish definite dampening characteristics of the pulley 31. However, in some instances and under some circumstances or combinations of variables, the unprotected single flange 40 of the pulley 31 of FIG. 11 may respond to high frequencies.

Figure 13:
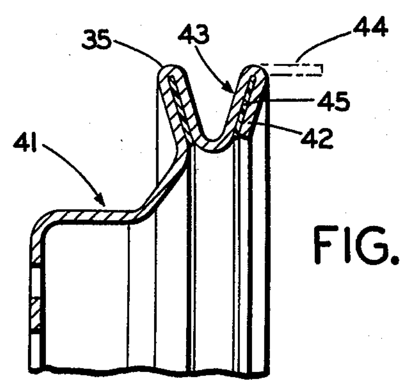
FIG. 13 is a view similar to FIG. 11 of another modified form of construction.

Frequency being a function of length and mass, the noise level of the pulley with an unprotected single flange amy be held to its lowest frequency range by providing a double fold in place of the single flange 40 of FIG. 11. This is shown in FIG. 13 wherein the pulley 41 may be provided with a double fold indicated at 42 for the outer groove-forming wall 43 of the groove of pulley 41. The double fold 42 may be formed by folding metal indicated in dot-dash lines at 44 back upon itself and trapping plastic material at 45 in the double fold 42 of the outer groove-forming wall in the same manner as is employed in the normal double fold flange 35 of the pulley groove, as illustrated in FIGS. 10 and 11.

IN GENERAL

A scientific explanation of this phenomenon is not entirely clear. However, it is believed that the new result may occur in accordance with the following explanation.

When a V-grooved sheet metal pulley is operating as a part of a V-belt drive, a friction drag of the belt on the pulley groove occurs. Likewise, the belt on entering the pulley groove and then on leaving the groove during travel of any belt zone, is believed to have a tendency to spread the sheet metal groove walls slightly during belt groove entry, to maintain the spread during belt groove contact, and to permit the spread to collapse as the belt leaves the groove.

Such forces to which the pulley groove walls are subjected apparently induce a vibration in the groove walls. At certain belt speeds and under certain belt loading, the natural resonant frequency of the vibrations, perhaps along with the friction drag of the belt, produces a ring-like or whining noise which is quite undesirable in the operation of motor vehicles that include V-belt and V-pulley drives for various accessories.

The various noise-dampened constructions described each have been found to noticeably alter the vibration frequency which results in a reduced noise level of the pulleys during operation. The metal dampener should be steel with steel pulleys. Aluminum does not work.

Accordingly, the new noise-dampened V-grooved sheet metal pulley construction provides a concept which may be applied to sheet metal pulleys in which one, two, three or more V-grooves are spun in a single metal blank and the various approaches described may be applied singly or in combination to alter the vibration frequency of such pulleys, at those certain speeds and loading which heretofore have produced objectionable noise level, to reduce the noise level to one that can be tolerated; provides tensioned noise-dampening means engaged against or laminated with at least one V-grooved wall of a V-grooved sheet metal pulley having one or more V-grooves spun in a single metal blank to disturb the natural resonant frequency of the pulley; provides a V-grooved sheet metal pulley construction with noise-dampening means which may be easily and inexpensively incorporated in the pulley construction during manufacture; and provides a construction which achieves the objectives stated, eliminates difficulties and undesirable characteristics heretofore existing in the art, and solves problems and obtains the new results indicated.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of various embodiments of the invention are by way of example, and the scope of the invention is not limited to the exact details shown or described.

Having now described the features, discoveries, and principles of the invention, the manner in which the new noise-dampened V-grooved sheet metal pulleys are constructed and operated, and the advantageous, new and useful results obtained; the new and useful structures, devices, components, elements, arrangements, parts, combinations, and relationships are set forth in the appended claims.

I claim:

1. A noise-dampened sheet steel pulley including at least one roller spun V-groove formed in the side wall of a cup-shaped sheet steel blank; tensioned noise-dampening means engaged against at least one V-groove wall of the pulley V-groove; and said tensioned means altering the vibration frequency of the pulley at pulley operated speeds under load from the natural resonant frequency of a similar pulley not equipped with said tensioned means, to reduce the noise level of the pulley during operation.

2. The pulley defined in claim 1 in which multiple V-grooves are roller spun in the side wall of the blank.

3. The pulley defined in claim 1 in which the V-groove has a double flange fold forming one of the V-groove walls, and in which the tensioned means comprises circular steel ring means trapped, locked and laminated during spinning of the V-groove between folds of the double flange fold.

4. The pulley defined in claim 3 in which the circular steel ring means comprises a steel washer trapped, locked and laminated between folds of the double flange fold.

5. The pulley defined in claim 3 in which the circular steel ring means comprises a thin walled tubular steel ring having a portion trapped between the folds of the double flange fold and other portions reshaped to conform to and laminated against the inside surfaces of the V-groove walls.

6. The pulley defined in claim 1 in which the V-groove has a double flange fold forming one of the V-groove walls, and in which the tensioned means comprises circular plastic ring means trapped, locked and laminated during spinning of the V-grooves between folds of the double flange fold.

7. The pulley defined in claim 6 in which the circular plastic ring means comprises a plastic washer trapped, locked and liminated between folds of the double flange fold.

8. The pulley defined in claim 6 in which the circular plastic ring means comprises an annular bead of plastic material applied to an inside surface of a portion of the cup-shaped blank which forms one of the folds of the double flange fold prior to spinning the V-groove in the cup-shaped sheet steel blank.

9. The pulley defined in claim 8 in which the annular bead of plastic material comprises a band cured to the inside surface of a cup-shaped blank prior to spinning the V-groove in the cup-shaped sheet steel blank.

10. The pulley defined in claim 6 in which the circular plastic ring means comprises a thin walled tubular plastic ring having a portion trapped between the folds of the double flange fold and other portions reshaped to conform to and laminated against the inside surfaces of the V-groove walls.

11. The pulley defined in claim 1 in which the tensioned means comprises circular steel ring means, L-shaped in cross section, having one portion fixed to one zone of the pulley and having another portion tensioned against the inside surface of at least one pulley V-groove wall.

12. The pulley defined in claim 11 in which a thermo-cured material coating is applied to that portion of the L-shaped ring means which is tensioned against the inside surface of the pulley V-groove wall.

13. The pulley defined in claim 1 in which the V-groove has a double flange fold forming one of the V-groove walls, and in which the tensioned means comprises annular plastic material means trapped, locked and laminated during spinning of the V-groove between folds of the double flange fold.

14. The pulley defined in claim 13 in which the annular plastic material means is composed of air cured plastic material.

15. The pulley defined in claim 13 in which the annular plastic material means is composed of thermo-cured plastic material.

* * * * *